N. LOMBARD.
GOVERNOR.
APPLICATION FILED OCT. 14, 1909.

960,358.

Patented June 7, 1910.
9 SHEETS—SHEET 2.

Witnesses:
Nathan C. Lombard
Edna C. Cleveland

Inventor:
Nathaniel Lombard,
by Walter E. Lombard,
Atty.

N. LOMBARD.
GOVERNOR.
APPLICATION FILED OCT. 14, 1909.

960,358.

Patented June 7, 1910.
9 SHEETS—SHEET 4.

Witnesses:
Nathan C. Lombard
Edna C. Cleveland

Inventor:
Nathaniel Lombard,
by Walter E. Lombard,
Atty.

N. LOMBARD.
GOVERNOR.
APPLICATION FILED OCT. 14, 1909.
960,358.
Patented June 7, 1910.
9 SHEETS—SHEET 6.
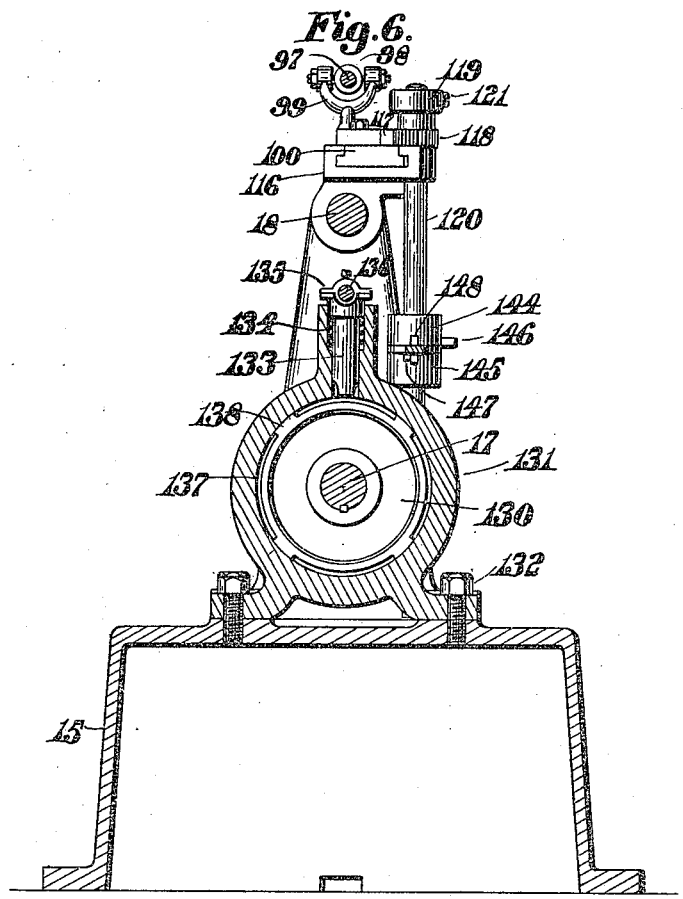
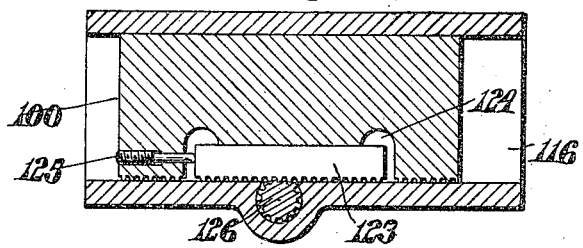
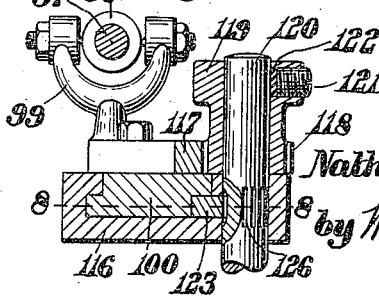
Witnesses:
Nathan C. Lombard
Edw. C. Cleveland
Inventor:
Nathaniel Lombard,
by Walter E. Lombard,
Atty.

N. LOMBARD.
GOVERNOR.
APPLICATION FILED OCT. 14, 1909.

960,358.

Patented June 7, 1910.
9 SHEETS—SHEET 7.

Witnesses:
Nathan B. Lombard
Edna C. Cleveland

Inventor:
Nathaniel Lombard,
by Walter E. Lombard,
Atty.

N. LOMBARD.
GOVERNOR.
APPLICATION FILED OCT. 14, 1909.

960,358.

Patented June 7, 1910.
9 SHEETS—SHEET 8.

Witnesses:
Nathan C. Lombard
Edna C. Cleveland

Inventor:
Nathaniel Lombard,
by Walter E. Lombard, Atty.

N. LOMBARD.
GOVERNOR.
APPLICATION FILED OCT. 14, 1909.

960,358.

Patented June 7, 1910.
9 SHEETS—SHEET 9.

Witnesses:
Nathan D. Lombard
Edna C. Cleveland

Inventor:
Nathaniel Lombard,
by Walter E. Lombard,
Atty.

UNITED STATES PATENT OFFICE.

NATHANIEL LOMBARD, OF WINTHROP, MASSACHUSETTS.

GOVERNOR.

960,358.

Specification of Letters Patent.   Patented June 7, 1910.

Application filed October 14, 1909.   Serial No. 522,649.

*To all whom it may concern:*

Be it known that I, NATHANIEL LOMBARD, a citizen of the United States of America, and a resident of Winthrop, in the county of Suffolk and State of Massachusetts, have invented certain new and useful Improvements in Governors, of which the following is a specification.

This invention relates to mechanism for controlling the speed of various motors and more particularly to such governors which serve to apply power from an auxiliary source to effect the movement of the valve, gate, or other regulating device.

The invention consists in certain novel features of construction and arrangement of parts which will be readily understood by reference to the description of the drawings and to the claims hereinafter given.

Figure 1:
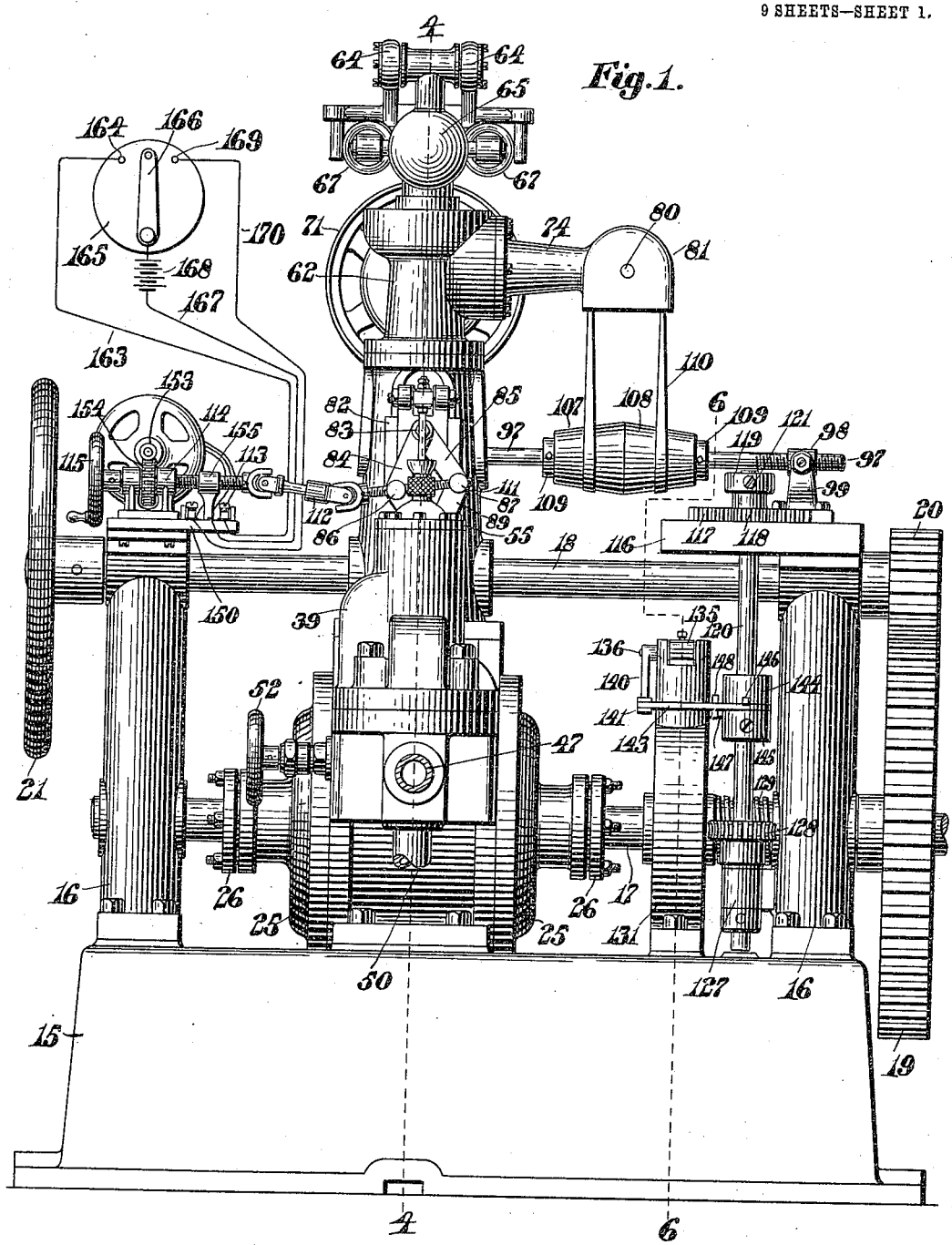
Figure 2:
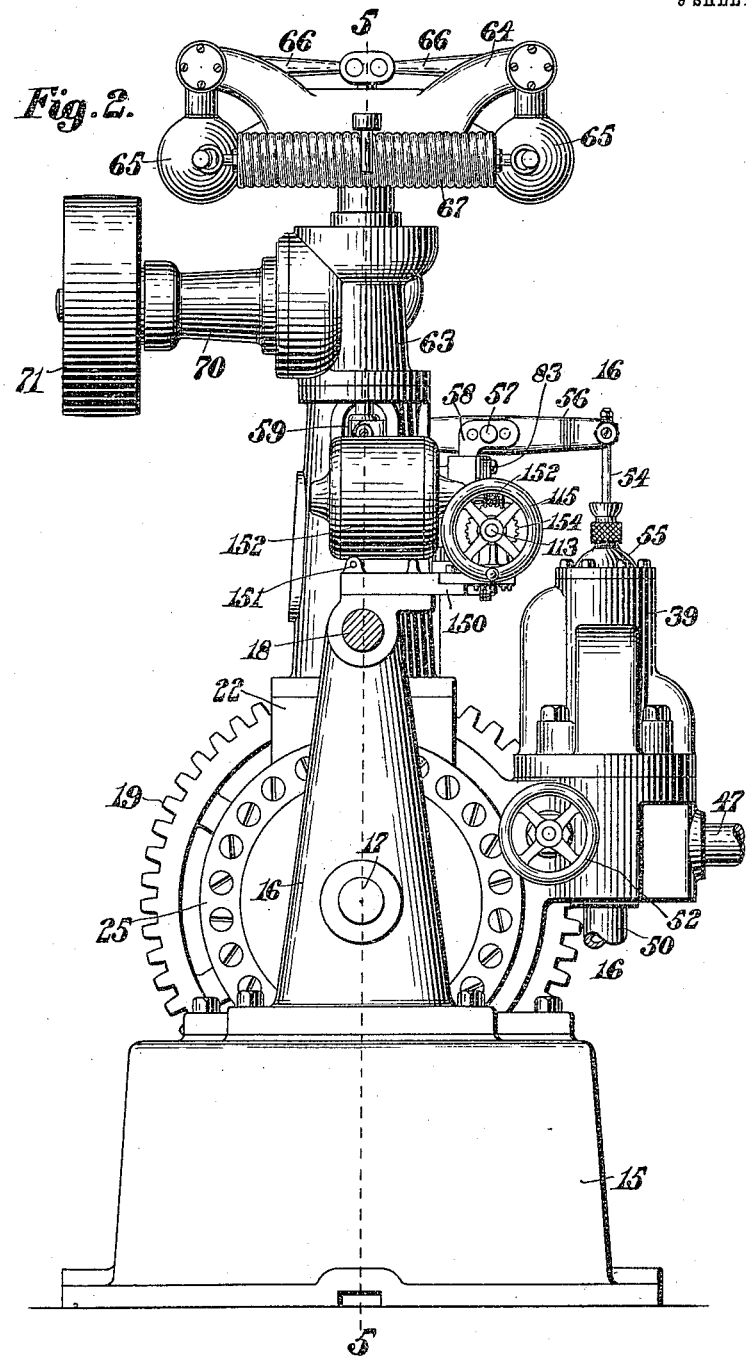
Figure 3:
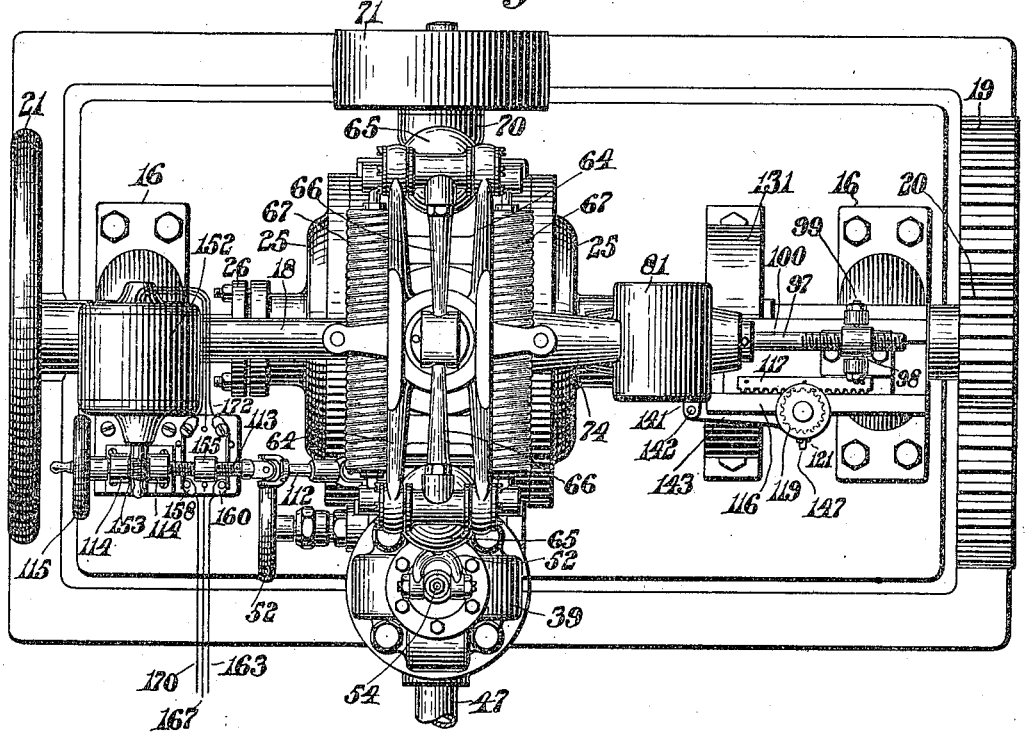
Figure 4:
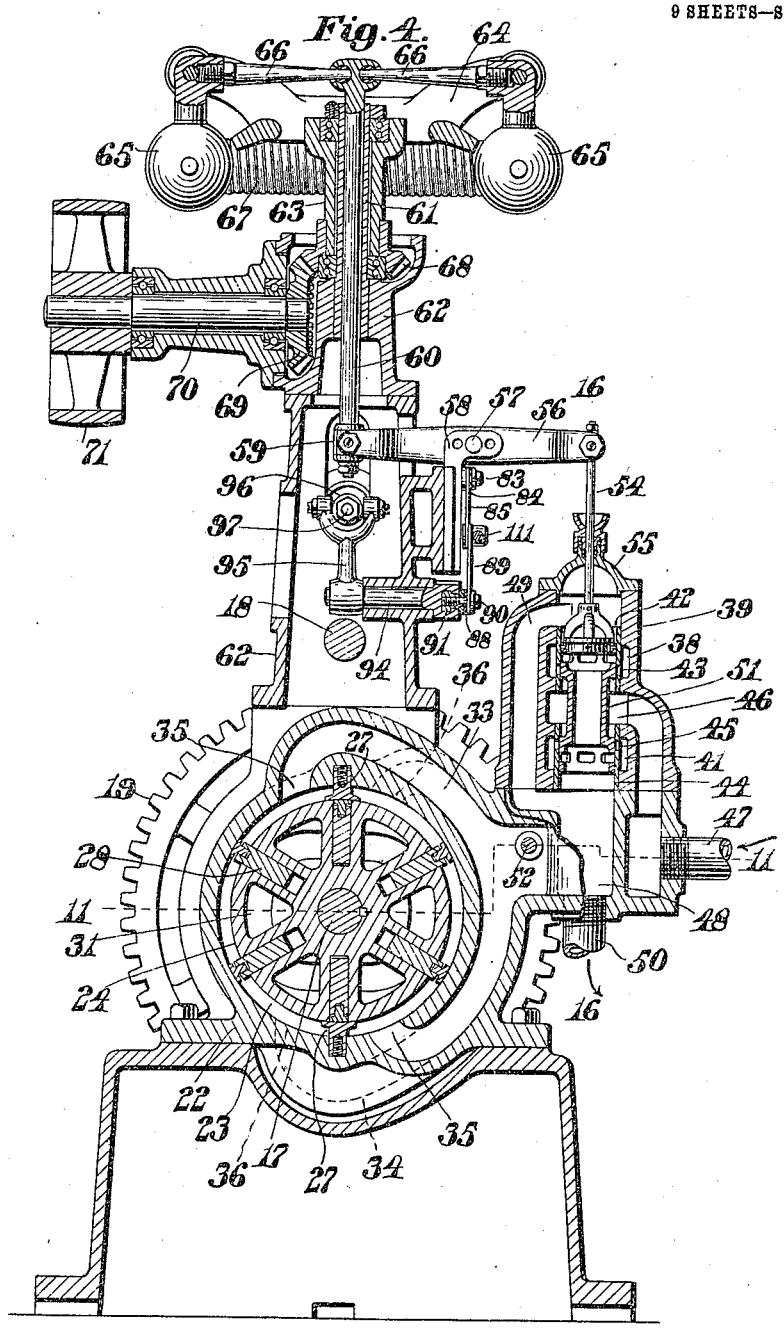
Figure 5:
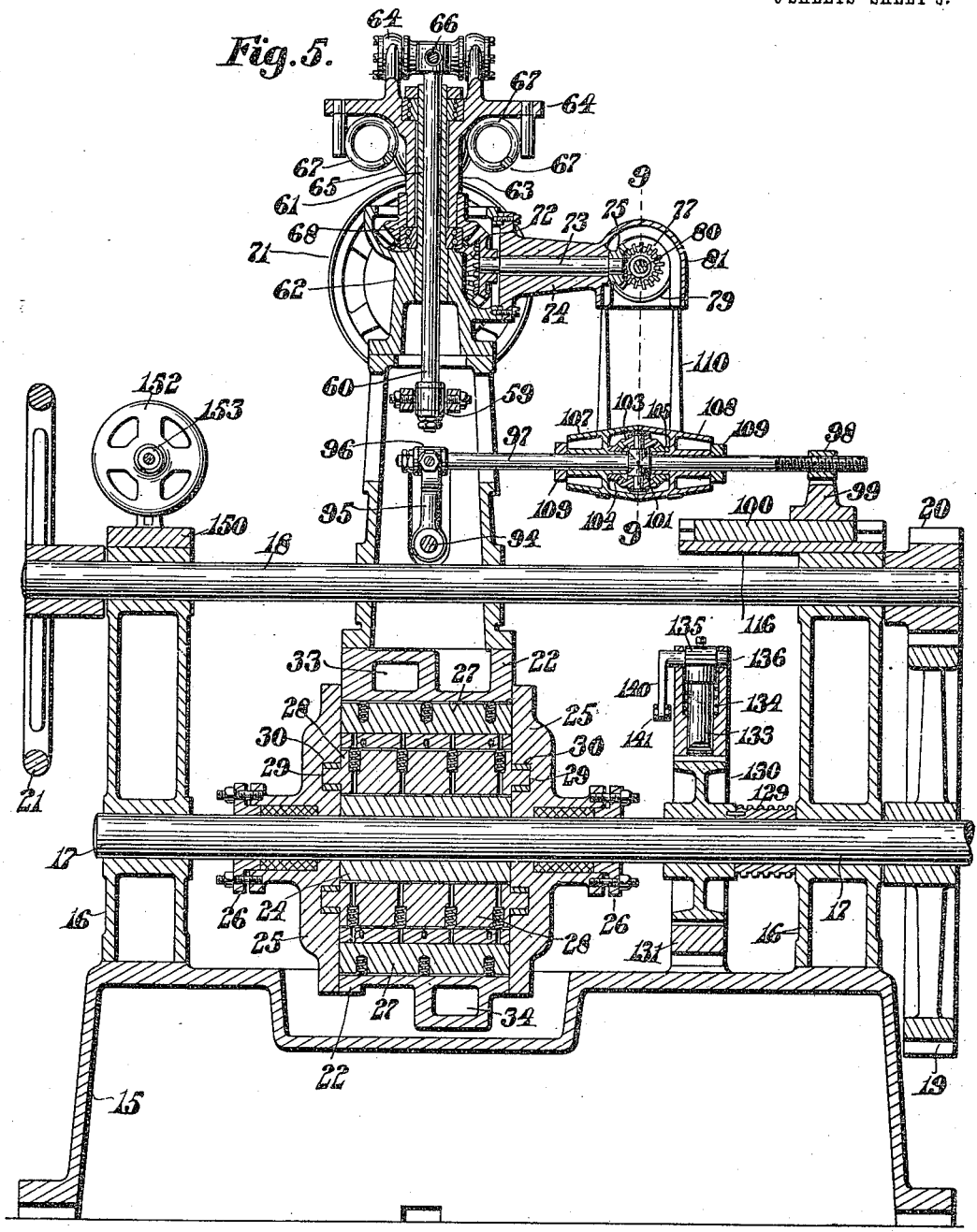
Figure 10:
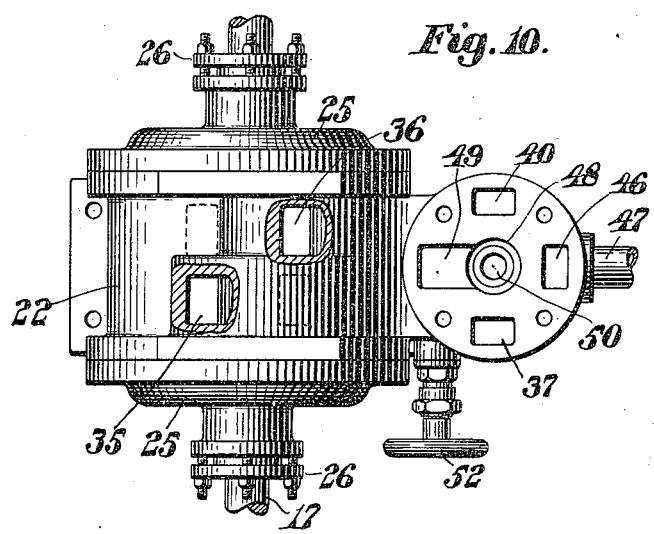
Figure 11:
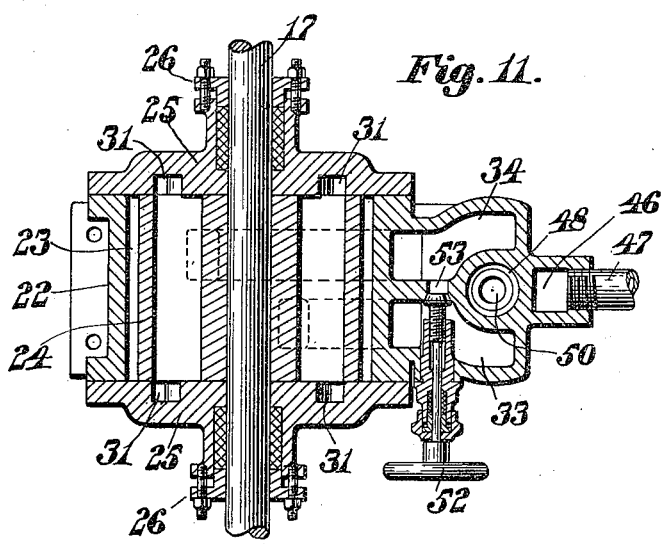
Figure 12:
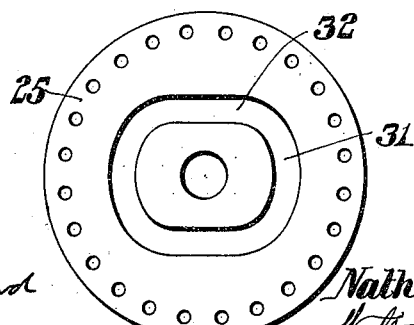
Figure 13:
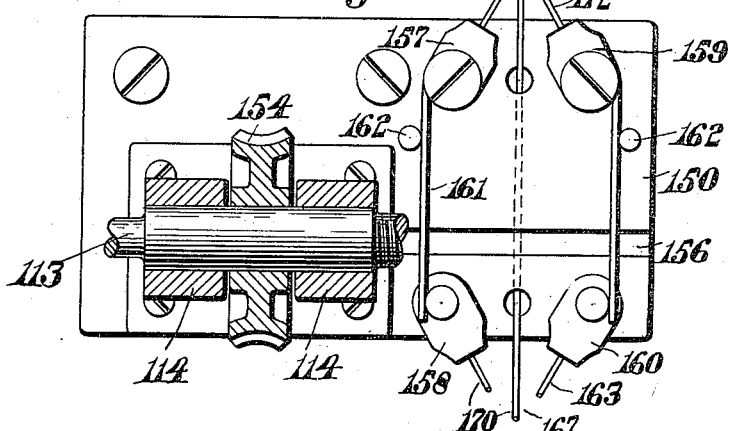
Figure 14:
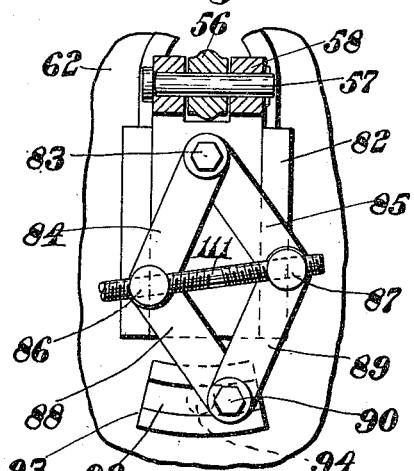
Figure 15:
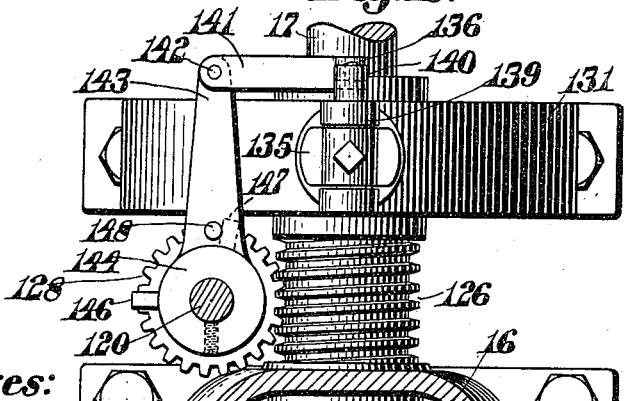
Figure 16:
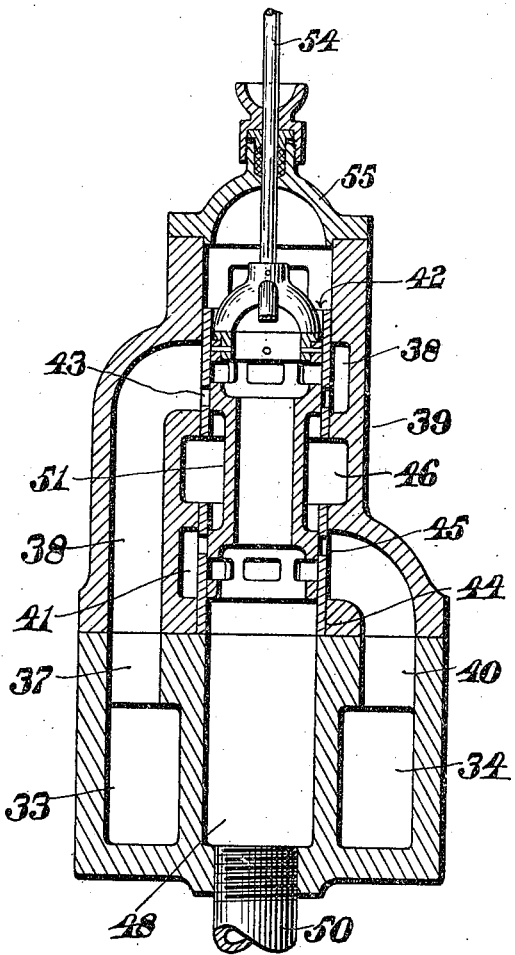
Figure 17:
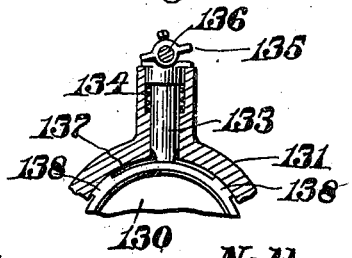

Of the drawings: Figure 1 represents a front elevation of a governor embodying the features of the present invention. Fig. 2 represents an elevation of the lefthand end of the same. Fig. 3 represents a plan of the same. Fig. 4 represents a transverse vertical section of the same, the cutting plane being on line 4—4 of Fig. 1. Fig. 5 represents a vertical longitudinal section, the cutting plane being on line 5—5 on Fig. 2. Fig. 6 represents a vertical transverse section, the cutting plane being on line 6—6 on Fig. 1. Fig. 7 represents an enlarged sectional detail of the upper part of Fig. 6. Fig. 8 represents a horizontal section of the same, the cutting plane being on line 8—8 on Fig. 7. Fig. 9 represents an enlarged sectional detail, the cutting plane being on line 9—9 on Fig. 5. Fig. 10 represents a plan of the hydraulic controlling device, a portion of the casing being broken in section. Fig. 11 represents a horizontal section of the same, the cutting plane being on line 11—11 on Fig. 4. Fig. 12 represents an elevation of one of the side cam plates therefor. Fig. 13 represents a horizontal sectional detail of a portion of the stop motion. Fig. 14 represents a sectional detail of the device for raising and lowering the pivoted lever for operating the valve. Fig. 15 represents a sectional plan of a portion of the mechanism for locking the actuating shaft. Fig. 16 represents a vertical section of the valve mechanism, the cutting plane being on line 16—16 on Figs. 2 and 4, and Fig. 17 represents a sectional detail of the actuating shaft locking mechanism.

Similar characters designate like parts throughout the several figures of the drawings.

In the drawings, 15 is a base, to the upper face of which are secured the standards 16 having bearings formed therein for the actuating shaft 17 and the operating shaft 18. The actuating shaft 17 may be extended in either direction and connected to a gate, valve, or other regulating device in any well-known manner so that the device to which it is connected will be operated by its rotation. Secured to the shaft 17 is a gear 19 meshing with a pinion 20 on the operating shaft 18, the opposite end of which has secured thereto a hand wheel 21 by which through the pinion 20 and gear 19 the actuating shaft 17 may be rotated by hand when desired. The base 15 also has secured thereto the casing member 22 in which is a cylindrical chamber 23, the cylindrical wall of which is concentric with the axis of the actuating shaft 17 extending therethrough. Within the chamber 23 and secured to the shaft 17 is a cylindrical member 24 the periphery of which is equi-distant at all points from the cylindrical wall of the chamber 23 while the ends thereof contact with the inner face of the end plates 25 secured to the casing member 22 by bolts or other well-known means. Each of the side plates 25 is provided with a suitable bearing in which the actuating shaft 17 freely revolves, each of these bearings being provided with a suitable stuffing box 26 to prevent leakage from the chamber 23. The casing member 22 is provided with two spring-pressed abutments 27 diametrically opposite each other, these abutments being pressed downwardly by means of said springs into contact with the periphery of the piston member 24. This piston member 24 is provided with a plurality of radial slots in each of which is mounted a blade 28 each end of which is provided with a trunnion 29 supporting a roller 30 adapted to be acted upon by the cam path 31 formed in the end plates 25. This cam path 31 is flattened as indicated at 32 opposite to the abutments 27 while between these flattened portions 32 the path is concentric to the axis of the actuating shaft 17.

While the rollers 30 or other projections formed upon the blades 28 are passing along the concentric portion of the cam path 31 the outer faces thereof are maintained in contact with the cylindrical wall of the chamber 23, each blade being provided at this point with a spring-pressed contacting shoe to insure contact with the wall of the chamber 23 when desired.

The blades 28 are drawn into the radial slots of the piston member 24 when the projecting rollers 30 pass along the flattened portion 32 of the cam path, thus permitting the blades to pass the abutments 27 without conflicting therewith. The casing member 22 is provided with two passages 33 and 34, each of these passages entering the chamber 23 at two points diametrically opposite one another.

The entering ports 35 of the passage 33 are on one side of the abutments 27 while the entering ports of the other passage 34 are on the opposite side of said abutments 27. The passage 33 terminates in a port 37 communicating with a chamber 38 in a valve casing 39 while the passage 34 terminates in a port 40 which communicates with a chamber 41 in said valve casing 39 in axial alinement with the chamber 38.

Extending through the chamber 38 is a tubular member 42 provided with a plurality of ports 43 therein while the chamber 41 has extending therethrough in axial alinement with the tubular member 42 a similar cylindrical member 44 provided with a plurality of ports 45. Between the chambers 38 and 41 and the tubular members 42 and 44 therein is a passage 46 communicating with an inlet pipe 47. This passage 46 communicates with the adjacent ends of the tubular members 42 and 44 while the opposite ends of these tubular members communicate with the exhaust chamber 48 and by-pass 49 communicating therewith. An exhaust pipe 50 extends from the exhaust chamber 48.

Mounted within the tubular members 42 and 44 is a reciprocating tubular valve 51, each end of which is of greater diameter than the intermediate section connecting the two enlarged ends together. The enlarged ends of the valve 51 are each provided with ports which are adapted during the reciprocation of said valve to register with the ports 43 and 45. The valve 51 is so constructed that when the ports at either end thereof are in communication with either set of ports 43 or 45 the other set of ports 43 or 45 will be uncovered by the enlarged ends of the valve 51 causing a communication to be secured between the chambers 38 or 41 and the inlet passage 46.

As shown in the drawings the ports 43 and 5 are covered so that there is no communication between the inlet passage 46 and the passages 33 or 34. Should, however, the valve 51 be lowered until the ports in the upper end thereof register with the ports 43, it is obvious that the ports 45 will be uncovered so that any liquid passing through the passage 46 will be permitted to enter the chamber 41 through these ports 45 and pass down the passage 40 into the passage 34 and into the chamber 23 and having entered this chamber will act against the abutments 27 projecting therein and the radial blades 28 to move the piston member 24 clockwise thus causing a rotation of the actuating shaft 17 and continuing this rotation as long as the ports 45 continue to be wholly or partially uncovered by the piston 51.

The chamber 23 is filled with liquid at all times and any liquid contained within the chamber when this operation takes place will be forced by the blades 28 around in said chamber until it passes therefrom through the ports 35 of the passage 33 and continuing will pass through the passage 37 into the chamber 38 and through the ports 43 into the exhaust chamber 48, and therefrom through the pipe 50.

It is quite obvious that a raising of the valve 51 until the ports in the lower end thereof register with the ports 45 will cause a reverse of this operation. It is self-evident that when the valve 51 is in the position indicated in the drawings the liquid contained within the chamber 23 and passages 33, 34, 37, and 40 and chambers 38 and 41 will be prevented from moving in either direction and will act upon the blades 28 to lock the piston 24 and prevent rotation of the shaft 17 in either direction.

Should it be desired at any time to rotate the shaft 17 without operating the valve mechanism as is sometimes the case, this rotation may be effected by means of the hand wheel 21, it only being essential in order to accomplish this to provide a means of communication between the passages 33 and 34 so that the liquid contained therein will be permitted to circulate. This may be accomplished by operating a valve 52, closing a by-pass 53 formed in the wall between the two passages 33 and 34. When this valve 52 has been opened the liquid contained within the chamber 23 and the passages 33 and 34 are free to circulate thus permitting the free rotation of the shaft 17, the locking pressure upon the blades 28 having been removed. A valve stem 54 secured to the valve 51 extends through the cap 55 on the valve casing 39 and is pivotally connected at its upper end to the lever 56 pivoted at 57 to the slide 58. The opposite end of said lever 56 is connected to a sleeve 59 surrounding the revoluble spindle 60 supported in a sleeve 61 secured to a standard 62 supported upon the upper end of the casing member 33.

Surrounding the sleeve 61 and revoluble thereon is a hub 63 supporting a suitable frame 64 in which are pivotally mounted the weighted members 65 each provided with an arm 66 co-acting with the revoluble member 60 to raise and lower the same according to the speed imparted to the frame 64.

The weighted members are normally held together by springs 67. The lower end of the hub 63 has secured thereto a bevel gear 68 which meshes with another bevel gear 69 secured to the shaft 70 on the outer end of which is secured a pulley 71 which is belted to some pulley driven by the mechanism, the speed of which is controlled by the actuating shaft 17. The gear 68 also meshes with a gear 72 on a shaft 73 mounted in a laterally extending bearing 74 formed upon or secured to the support 62. To the outer end of this shaft 72 is secured a gear 75 which in turn meshes with two gears 76 and 77 on either side thereof. Each of the gears 76 and 77 is secured to and revoluble with a pulley 78 or 79 freely revoluble about a pin 80 mounted in the hood 81.

The slide 58 is vertically movable between guides 82 and has secured thereto by means of the pin 83 two links 84 and 85, the free ends of which are connected by means of the pivot members 86 and 87 to the free ends of another pair of links 88 and 89 which are pivotally connected by means of the stud 90 to a block 91 movable in the curved slot 92 formed in the member 93 formed upon or secured to the rocker shaft 94 mounted in a bearing in the standard 62. The rear end of the rocker shaft 94 has secured thereto a bifurcated lever 95, in the end of which is supported a sleeve 96 in which is revolubly mounted a rod 97, the opposite end of which is threaded to a nut 98 pivotally mounted in the bifurcated standard 99 secured to a slide 100.

Secured to the rod 97 normally directly beneath the pin 80 is a collar 101 having projecting from opposite sides thereof studs 102 upon which are revolubly mounted bevel gears 103 meshing with the gears 104 and 105 formed upon or secured to the cone pulleys 107—108. The larger ends of the pulleys 107—108 abut and are freely revoluble in opposite directions between the collars 109 on the rod 97. An endless belt 110 passes partially around each of these cone pulleys 107—108 and over the pulleys 78 and 79 on the pin 80. It is self-evident from an inspection of the drawings that the rotation of the shaft 73 will transmit motion through the gears 75, 76, 77 to the belt 110 to cause a rotation of the pulleys 107—108 in opposite directions. As these pulleys 107—108 are freely revoluble upon the rod 97 when the belt 110 is equi-distant from the larger ends of each of the cone pulleys 107—108 these pulleys will turn in opposite directions, causing the gears 103 to rotate about the trunnions 102 without any movement of the rod 97. It is obvious, however, that should the rod 97 be moved endwise in either direction the positions of the belt 110 relative to the two cone pulleys 107—108 will be changed, the belt 110 riding up on the greater diameter of one of the pulleys and riding down on to a smaller diameter of the other pulley, thus changing the relative speeds of these two pulleys and as a consequence of this change in speed, the gears 104 or 105 secured to said pulleys will rotate at unequal speeds and therefore with the idler gears 103 meshing therewith will be prevented from freely turning about their trunnions 102. This action will cause the rod 97 to be rotated about its axis an amount proportional to the excess of the speed of one pulley 107 or 108 over its companion pulley. It is obvious, therefore, that when this action occurs and the rod 97 is rotated about its axis the threaded end thereof in turning in the nut 98 will cause the rod to be moved endwise relative to the standard 99 to which said nut 98 is pivotally connected. This endwise movement of the rod 97 will cause the rocker lever 97 to rock the shaft 94 and the slotted member 93 secured thereto. The pivotal connections 86 and 87 are provided with heads through which extends a revoluble member 111 threaded to said heads in opposite directions. By this construction the pivotal connections 86 and 87 are locked in any desired separated positions and the rotation of the rod 111 will cause them to be moved equally farther apart or nearer together as the case may be. This rod 111 is connected by a universal joint 112 to a revoluble shaft 113 mounted in bearings 114 and having secured to its opposite end a hand wheel 115 by which said threaded rod 111 may be rotated to adjust the positions of the pivotal connections 86 and 87 relative to each other.

It is obvious that by rotating the threaded member 111 the distance between the pivot pin 83 and the pivot pin 90 may be increased or decreased at the will of the operator. Should the pivot pin 90 be in alinement with the rocker shaft 94 the slide 58 would not be raised or lowered during the rocking movement of said shaft but if the block 91 is moved out of alinement with said rocker shaft to a greater or less extent and clamped in its new position by means of the clamping pivot member 90, it is evident that any further rocking of the shaft 94 will cause a raising and lowering of the slide 58 in proportion to the distance the pin 90 is from the axis of the shaft 94 and the extent of movement accorded to said rocker shaft 94 by the endwise movement of the rod 97.

The slide 100 is movable longitudinally of the machine in a grooved plate 116 and has secured to its upper face a toothed rack 117 meshing with a pinion 118 formed upon a collar 119. This collar 119 is mounted upon the upper end of a shaft 120 and is provided with a member 121 threaded thereto between the inner end of which and the shaft 120 is a suitable leather packing 122 by which the collar is frictionally held thereon and rotates therewith until the further rotation thereof with the shaft 120 is prevented, in which event the shaft 120 may continue to rotate independently of said collar 119. In a slot formed in the slide 100 is another rack 123 of less length than the slot 124 in which it is positioned. An adjustable member 125 threaded to the slide 100 provides a stop for the rack member 123 in one direction while the wall of said slide 100 forms a stop therefor in the opposite direction. The teeth of the rack 123 mesh with gear teeth 126 formed in the periphery of the shaft 120, it being obvious that the diameter of the pinion thus formed is considerably less than the diameter of the pinion 118 formed upon the collar 119 and meshing with the superimposed rack 117. This shaft 120 is mounted in a bearing in the slotted plate 116 and in a bearing 127 formed upon one of the standards 16. This shaft 120 has secured thereto a worm gear 128 meshing with a worm 129 formed upon or secured to the actuating shaft 17. It is obvious, therefore, that any rotation of the actuating shaft 17 causes a very slow rotation of the vertical shaft 120. As the shaft 120 rotates the gear 118 meshing with the rack 117 will immediately cause a movement of the slide 100 and this gear 118 will continue to act while the gear 126 is moving the movable rack 123 to the extreme of its movement but as soon as this has reached a shoulder formed upon or secured to the slide 100 the further movement of the slide 100 will be imparted thereto by means of the pinion 126 at a lesser speed than that accorded to it by means of the gear 118.

As soon as the rack 123 has reached the extreme of its movement and is positively driven by the pinion 126 the collar 119 will be moved about the shaft 120 and the gear 118 become inoperable. Secured to the actuating shaft 17 is a notched disk 130 inclosed within a casing 131 secured to the base 15 by any suitable means such as the bolts 132. This casing 131 has an upward extension in which is mounted a bolt 133 forced outwardly by means of a spring 134 against a rocking member 135 secured to a rocker shaft 136.

It is obvious from an inspection of Fig. 6 of the drawings that any rocking movement of the shaft 136 and the cam member 135 secured thereto in either direction will cause the toes projecting from said member to engage similar projections on the bolt 133 and move the bolt downwardly into one of the notches 137 of the disk 130 so that as the shaft 17 rotates one of the walls 138 between the notches 137 will contact with the bolt 133 and prevent further rotation of the actuating shaft.

The rocker shaft 136 is mounted in bearings 139 formed upon the upper end of the extension of the casing 131 and has secured to its outer end a rocker lever 140 the free end of which has pivotally connected thereto a link 141, the opposite end of which is pivotally connected at 142 to an arm 143 having at the opposite end an opening therethrough fitting over the shaft 120. This arm 143 is interposed between two collars 144 and 145, each of which is provided with a projecting member 146 and 147 these members 146 and 147 being in the path of movement of a pin or other projection 148 extending through from opposite sides of the plate or arm 143. These collars 144 and 145 may be adjusted about the axis of the shaft 120 and secured in any predetermined position by means of suitable set screws. Normally the various parts of this locking mechanism are in the position shown in Figs. 6 and 15. As soon, however, as the actuating shaft 17 has made a sufficient number of revolutions to operate the gate, valve, or other device to which it is connected, as, for instance, if it was connected to a gate to completely close the gate or completely open it, the slow rotation of the shaft 120 effected during these revolutions of the actuating shaft will have brought either one or the other of the projections 146—147 into contact with the projections 148 and caused the arm 143 to be moved about the axis of said shaft 120, thus imparting a rocking movement to the rocker shaft 136 and moving the bolt 133 into position to engage with the projections 138 on the disk 130 to stop further rotation of said shaft.

The bearings 114 are secured to a plate 150 supported upon one of the standards 16. Pivoted to this plate 150 at 151 is an electric motor 152 on the driving shaft of which is the worm 153 meshing with a worm gear 154 secured to the revoluble shaft 113 between the bearings 114. It is obvious that when the motor 152 is in operation the worm 153 through the worm gear 154 will cause a rotation of the shaft 113 and through the instrumentality of the universal shaft 112 the rotation of the threaded member 111 to adjust the position of the slide 58.

The shaft 113 has threaded thereto a nut 155 provided with a downwardly extending arm adapted to travel along the slot 156 in the plate 150. The walls of the slot 156 prevent the nut 155 from turning during the rotation of the shaft 113 therefore causing the nut 155 to travel along the shaft 113 in either direction during such rotation.

Secured to the plate 150 are a plurality of terminals 157, 158, 159, and 160. Secured to each of the terminals 157 and 159 is a spring member 161 normally maintained against the terminals 158 and 160 by means of the stop pins 162. These spring members 161 electrically connect the terminals 157 and 158 and the terminals 159 and 160, and are in the path of movement of the arm 155 which is adapted at either extreme of its movement to contact with one of the spring members 161 and move it from contact with the terminal 158 or 160 and break the circuit.

From the terminal 160 a wire 163 leads to a contact 164 of a suitable switch 165, the pivotal connection of the spring arm 166 of which is connected by a wire 167 to an electric motor 152 as indicated in Figs. 1 and 3 of the drawings. Between the switch 165 and the motor 152 in the line 167 is a battery or other suitable source of electric energy 168. The switch 165 has another contact point 169 from which a wire 170 leads to the terminal 158. The terminals 157 and 159 are connected respectively by wires 171 and 172 to the electric motor 152.

By moving the switch arm 166 so as to connect with either the contact 164 or 169 the electric motor 152 may be rotated in either direction at the will of the operator and as this rotation causes the threaded member 113 to rotate the nut 155 thereon is moved in either direction along said member 113 until it comes into contact with either one of the members 161 and has moved said member sufficiently far to break the contact with the terminals 158 and 160, when the circuit to the electric motor will be broken and its further operation prevented. By such a mechanism as is shown and just described the whole apparatus may be regulated by an operator at the switchboard through the electric motor 152 at any distance therefrom.

The principal object of the link connections between the pivot 83 on the slide 58 and the pivot 90 on the slide 91 movable in the slot 92 on the rocker member 94 is to enable the operator either by means of the hand wheel 115 or another operator at a distance by means of the switch 165, to vary the distances between these pivots in order to raise or lower the pivot member 57 of the lever 56. This change in the position of the pivot 57 will permit the valve 51 to be moved into a central position relative to the ports 43 and 45 at varying speeds of the centrifugal mechanism controlling the movement of said lever 56, it being obvious that the higher the pivot member 57 may be the less centrifugal speed is required to operate the lever 56 to cause the valve 51 to be returned to a central position, while the lower the position the pivot member 57 may be the greater centrifugal speed is necessary in order to return the valve 51 to its central position.

When once adjusted to vary the operation of the apparatus the connections between the pivots 83 and 90 are practically rigid. One of the principal objects of this adjustment just described is to provide a means for adjusting two or more governors operating in the same system so that they will operate in harmony or in parallel, which is necessary in order to secure effective results.

The operation of the invention is as follows:—Usually a valve (not shown) in the inlet pipe 47 is closed first and the valve 52 is then opened, thus putting the governor in a condition making possible the rotation of the actuating shaft by the hand wheel 21. The gate or valve is then opened the desired amount and the valve 52 is closed again and the inlet pipe valve is opened thus leaving the entire device in condition to operate automatically.

As the centrifugal mechanism is driven by the mechanism controlled by the gate or valve it is obvious that as soon as this is opened and the fluid is admitted to the valve chamber 46, any variation in the opening of the valve or gate will affect the speed of the centrifugal mechanism and any variation in the speed of the centrifugal mechanism will affect the opening of the valve or gate. In other words, if the opening of the gate or valve is sufficient to secure a greater speed than is desired the centrifugal mechanism will move the balls 65 outwardly and depress the rear end of the lever 56 about its pivot 57, thus raising the valve 51 until its lower ports register with the ports 45 and thereby admitting pressure into the passage 33 and through the chamber 38 to the chamber 23 to act upon the blades 28 and move the actuating shaft 17 contra clockwise. This movement of the actuating shaft will be sufficient to reduce the opening of the gate or valve thereby reducing the speed of the centrifugal mechanism.

As soon as the actuating shaft begins to rotate it will turn the shaft 120 and move the rod 97 to the right and cause a movement of the rocker shaft 94 sufficient to lower the pivot 57 enough to return the valve 51 to its normal position. During this endwise movement of the rod 97 the pulleys 107—108 will move therewith causing the belt 110 to slip into new positions thereon, thus causing the rotation of said rod, this rotation through the medium of its threaded end in the nut 98 returning the rod 97 and the parts thereon to their normal positions, thus raising the pivot 57 to its original position. During this return movement of the rod 97 and raising of the pivot 57 the slackened speed will permit the weights 65 to return to their normal positions and raise the inner end of the lever 56 to its normal position, thus again bringing the valve 51 to a central position. The slide 100 is moved in the opposite direction only when the speed becomes less than the normal desired speed.

It is believed that the operation of the other mechanisms included in the device will be readily understood without further description.

Having thus described my invention, I claim:—

1. In a governor, the combination with a revoluble actuating shaft; of a fluid cylinder provided with an abutment; a member secured to said shaft and provided with a peripheral projection on each side of said abutment; a passage to said cylinder on each side of said abutment; a valve for controlling the admission of fluid to either of said passages; and a valved by-pass between said passages.

2. In a governor, the combination with a revoluble actuating shaft; of a valve for controlling the revolution of said shaft; a pivoted lever; a connector between said valve and one end of said lever; centrifugal mechanism; a connector between the other end of said lever and said centrifugal mechanism; and means actuated by said shaft for raising and lowering said pivot.

3. In a governor, the combination with a revoluble actuating shaft; of a valve for controlling the revolution of said shaft; a pivoted lever; a connector between said valve and one end of said lever; centrifugal mechanism; a connector between the other end of said lever and said centrifugal mechanism; means including a rocker lever actuated by said shaft for raising and lowering said pivot; and a revoluble threaded member connected to said rocker lever for returning said pivot to its normal position.

4. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; mechanism actuated by said shaft for causing a less movement in the same direction of the lever pivot; and means included in said mechanism for returning said lever to its normal position.

5. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; means actuated by said shaft for reciprocating said slide to rock said rocking device; and means for revolving said threaded member.

6. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member and a plurality of rack teeth; means including a pinion engaging said rack teeth actuated by said shaft for reciprocating said rack to rock said rocking device; and means for revolving said threaded member.

7. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a rack secured thereto; a second rack movable thereon; a revoluble toothed member actuated by said shaft and operating said second rack; and a pinion frictionally secured to said toothed member for operating the first rack.

8. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a rack secured thereto; a second rack movable thereon; a revoluble toothed member actuated by said shaft and operating said second rack; and a pinion frictionally secured to said toothed member for operating the first rack, the teeth of said pinion being farther from the axis of said toothed member than the teeth thereon.

9. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a rack secured thereto; a second rack movable thereon; a revoluble toothed member actuated by said shaft and operating said second rack; a pinion frictionally secured to said toothed member for operating the first rack; and adjustable means for limiting the movement of said second rack.

10. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; and means actuated by said shaft for imparting to said slide a variable movement.

11. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a vertical shaft; a worm wheel thereon; a worm on the actuating shaft meshing therewith; and means carried by said vertical shaft for imparting to said slide a variable movement.

12. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a vertical shaft; a worm wheel thereon; a worm on the actuating shaft meshing therewith; means carried by said vertical shaft for imparting to said slide a variable movement; mechanism for preventing the rotation of the actuating shaft; and means carried by said vertical shaft for operating said mechanism.

13. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocking device for raising and lowering the lever pivot; a revoluble threaded member connected thereto; a slide provided with a nut for said threaded member; a vertical shaft; a worm wheel thereon; a worm on the actuating shaft meshing therewith; means carried by said vertical shaft for imparting to said slide a variable movement; mechanism for preventing the rotation of the actuating shaft; and means carried by said vertical shaft and adjustable thereon for operating said mechanism.

14. In a governor, the combination with a revoluble actuating shaft; of a valve for controlling the revolution of said shaft; means for regulating the movement of said valve in relation to the operation of said shaft; a positive locking device including a notched disk rotatable with said shaft; and means actuated by said shaft for operating said locking device.

15. In a governor, the combination with a revoluble actuating shaft; of a valve for controlling the revolution of said shaft; means for regulating the movement of said valve in relation to the operation of said shaft; a positive locking device including a notched disk rotatable with said shaft; a revoluble device actuated by said shaft; a locking bolt co-acting with said notched disk; and means operated by said revoluble device for moving said bolt into a notch in said disk.

16. In a governor, the combination with a revoluble actuating shaft; of a valve for controlling the revolution of said shaft; means for regulating the movement of said valve in relation to the operation of said shaft; a positive locking device including a notched disk rotated with said shaft; a revoluble device actuated by said shaft; a locking bolt co-acting with said notched disk; a rocker member for operating said bolt; and means operated by said revoluble device for operating said rocker member to move said bolt into a notch in said disk.

17. In a governor, the combination with a revoluble actuating shaft; of a valve for controlling the revolution of said shaft; means for regulating the movement of said valve in relation to the operation of said shaft; a positive locking device including a notched disk rotatable with said shaft; a revoluble member actuated by said shaft; two collars secured thereto each provided with a radiating finger; an arm freely movable about said revoluble member and provided with projections in the path of movement of said fingers; a rocker lever secured to the free end of said arm; a locking bolt co-acting with said notched disk; and a cam member operated by said rocker arm adapted to move said bolt into engagement with said notched disk.

18. In a governor, the combination with a revoluble actuating shaft; of a valve for controlling the revolution of said shaft; means for regulating the movement of said valve in relation to the operation of said shaft; a positive locking device including a notched disk rotatable with said shaft; a revoluble member actuated by said shaft; two collars adjustably secured thereto each provided with a radiating finger; an arm freely movable about said revoluble member and provided with projections in the path of movement of said fingers; a rocker lever secured to the free end of said arm; a locking bolt co-acting with said notched disk; and a cam member operated by said rocker arm adapted to move said bolt into engagement with said notched disk.

19. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means for moving said nut and rod endwise; and means for rotating said rod in said nut.

20. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means actuated by said actuating shaft for moving said nut and rod endwise; and means for rotating said rod in said nut.

21. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means for moving said nut and rod endwise; gearing for rotating said centrifugal mechanism; and means driven by said gearing for rotating said rod in said nut.

22. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means actuated by said actuating shaft for moving said nut and rod endwise; gearing for rotating said centrifugal mechanism; and means driven by said gearing for rotating said rod in said nut.

23. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means for moving said nut and rod endwise; two cone pulleys loosely mounted on said threaded rod; a gear secured to each; an intermediate gear meshing with both pulley gears; and means for moving said pulleys in opposite directions.

24. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means for moving said nut and rod endwise; two cone pulleys loosely mounted on said threaded rod; a gear secured to each; an intermediate gear meshing with both pulley gears; gearing driving said centrifugal mechanism; two pulleys driven in opposite directions by said gearing; and a continuous belt over said pulleys and said cone pulleys.

25. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means carried thereby adapted to raise and lower the pivot of said lever; an arm secured to said rocker shaft; a threaded rod pivotally connected thereto; a nut therefor; means for moving said nut and rod endwise; two cone pulleys loosely mounted on said threaded rod; a gear secured to each; an intermediate gear meshing with both pulley gears; and means for moving said pulleys in opposite directions at different speeds.

26. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; and pivotal connections between each pair of links.

27. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; and means for retaining said pivotal connections at any desired distance apart.

28. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; and adjustable means for retaining said pivotal connections at any desired distance apart.

29. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; and a rod provided with oppositely threaded portions threaded to said pivotal connections.

30. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a rod provided with oppositely threaded portions threaded to said pivotal connections; and means for rotating said rod.

31. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a rod provided with oppositely threaded portions threaded to said pivotal connections; and an electric motor for rotating said rod.

32. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a pivoted support; an electric motor thereon; a rod rotated thereby; and a universal connection between said rod and said link operating rod.

33. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a pivoted support; an electric motor thereon; a threaded rod rotated thereby; a nut thereon; means preventing the turning of said nut; and means in the path of said nut for stopping said motor.

34. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a pivoted support; an electric motor thereon; a threaded rod rotated thereby; a nut thereon; means preventing the turning of said nut; and electric contacts in the path of said nut and adapted to be moved thereby to break the electric circuit in the path of said nut for stopping said motor.

35. In a governor, the combination with a revoluble actuating shaft; of a valve for controlling the revolution of said shaft; a pivoted lever; a connector between one end thereof and said valve; centrifugal mechanism adapted to move said lever about its pivot and operate said valve; a rocker shaft; means actuated by said actuating shaft for rocking said rocker shaft; a member secured to said rocker shaft provided with a curved slot; a slide carrying a pivot for said lever; a slidable member in said curved slot; two links pivotally secured to said slidable member; two other links pivotally secured to said slide; pivotal connections between each pair of links; a rod provided with oppositely threaded portions threaded to said pivotal connections; and a hand wheel for rotating said rod.

Signed by me at 4 Post Office Sq., Boston, Mass., this 12th day of October, 1909.

NATHANIEL LOMBARD.

Witnesses:
NATHAN C. LOMBARD,
EDNA C. CLEVELAND.